US007526585B2

(12) United States Patent
Jeong

(10) Patent No.: US 7,526,585 B2
(45) Date of Patent: Apr. 28, 2009

(54) MULTI-TASKING APPARATUS AND METHOD IN PORTABLE TERMINAL WHEREIN CONTROLLER SWITCHES TO STANDBY MODE WHILE PLAYING MUSIC FILE AS BACKGROUND MUSIC

(75) Inventor: Moon-Sang Jeong, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 11/390,338

(22) Filed: Mar. 28, 2006

(65) Prior Publication Data

US 2007/0061806 A1 Mar. 15, 2007

(30) Foreign Application Priority Data

Aug. 30, 2005 (KR) .................. 10-2005-0079921

(51) Int. Cl.
*G06F 13/00* (2006.01)
*G06F 9/46* (2006.01)
(52) U.S. Cl. .............. 710/72; 710/8; 710/9; 710/10; 710/73; 710/74; 455/550; 455/566; 718/100; 718/107
(58) Field of Classification Search ........... 710/8–10, 710/72–74; 455/550, 566; 718/100, 107
See application file for complete search history.

(56) References Cited

U.S. PATENT DOCUMENTS

| 7,123,945 B2 * | 10/2006 | Kokubo ............... 455/566 |
| 2002/0067308 A1 * | 6/2002 | Robertson ........... 342/357.17 |
| 2002/0077156 A1 * | 6/2002 | Smethers ............. 455/566 |
| 2005/0054379 A1 | 3/2005 | Cao et al. |
| 2005/0083642 A1 * | 4/2005 | Senpuku et al. ........ 361/681 |

FOREIGN PATENT DOCUMENTS

| TW | 403866 | 9/2000 |
| TW | 200502940 A | 1/2005 |
| TW | M269546 | 7/2005 |

OTHER PUBLICATIONS

"Operation Introduction to Windows Media Player," Mircosoft Company, Jan. 3, 2003 Taiwan,<http://www.microsoft.com/taiwan/windowsxp/windowsmediaplayer/getstarted/>.

* cited by examiner

*Primary Examiner*—Tammara Peyton
(74) *Attorney, Agent, or Firm*—Roylance, Abrams, Berdo & Goodman, L.L.P.

(57) ABSTRACT

An apparatus and method capable of performing multiple tasks in a portable terminal are provided, in which menu functions of the portable terminal can be implemented while continuing to play the music. The multi-tasking apparatus includes a controller for performing controlling to implement at least one menu function while playing a music file and a display unit for displaying an indication that the music file is being played during the implementation of the menu function.

17 Claims, 3 Drawing Sheets

MULTI-TASKING APPARATUS AND METHOD IN PORTABLE TERMINAL WHEREIN CONTROLLER SWITCHES TO STANDBY MODE WHILE PLAYING MUSIC FILE AS BACKGROUND MUSIC

PRIORITY

This application claims the benefit under 35 U.S.C. § 119(a) of Korean Patent Application filed in the Korean Intellectual Property Office on Aug. 30, 2005 and assigned Serial No. 2005-79921, the entire disclosure of which is hereby incorporated by reference.

BACKGROUND OF THE INVENTION

1. Field of the Invention

The present invention generally relates to an apparatus and method for performing multiple tasks in a portable terminal. More particularly, the present invention relates to a multi-tasking apparatus and method in a portable terminal, where menu functions of the portable terminal can be implemented while continuing to play a music file.

2. Description of the Related Art

Portable terminals include various applications such as scheduling, game, and Short Message Service (SMS) applications. When integrated with digital devices, portable terminals include multimedia menus such as options for MP3 music play. Generally, a portable terminal having an MP3 music play function controls and plays an MP3 music file using a separate player. For example, a user may select an MP3 music play function from menus of a portable terminal for listening to the music. The user may also selectively use control-related functions such as play, pause, repeat, and terminate the MP3 music play function.

However, the user cannot simultaneously work on several menus of the portable terminal while listening to the music using the conventional MP3 music play function. In other words, the user cannot use the other functions of scheduling, picture viewing, or game menu among others while listening to the music.

To address this problem, a control processor is added to manage only MP3 music play, resulting in an increase in cost and an increase in the complexity of hardware and software configurations.

Accordingly, there is a need for an improved system and method to allow a user to simultaneously work on multiple menus of the portable terminal while listening to music.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a multi-tasking apparatus and method in a portable terminal, in which menu functions of the portable terminal can be implemented while continuing to play a music file.

According to one aspect of an exemplary embodiment of the present invention, a multi-tasking apparatus in a portable terminal is provided. The multi-tasking apparatus includes a controller for performing controlling to implement at least one menu function while playing a music file and a display unit for displaying an indication that the music file is being played during the implementation of the menu function.

According to another aspect of an exemplary embodiment of the present invention, a multi-tasking method in a portable terminal is provided. Use of the multi-tasking method allows a music file to be played in the portable terminal and allows menu functions of the portable terminal to be implemented while continuing to play the music file.

According to another aspect of an exemplary embodiment of the present invention, a multi-tasking method in a portable terminal is provided. Where a music background play object is prevented in a standby mode. The music background play object acquires a task for music background play and provides a control interface for music play. The music file is played through multi-tasking in the standby mode using the music background play object upon selection of a music play mode in the portable terminal. The played music file is selected as background music during the play of the music file, switching to the standby mode while continuing to play the music as background music upon selection of the played music file as background music. The menu functions of the portable terminal are implemented in the standby mode so that the play of background music is maintained and the menu functions of the portable terminal are implemented while continuing to play background music.

According to another aspect of an exemplary embodiment of the present invention, a multi-tasking method in a portable terminal is provided. Where a music background play object is generated in a standby mode. The music background play object acquires a task for music background play and provides a control interface for music play. The music file is played through multi-tasking in the standby mode using the music background play object upon selection of a music play mode in the portable terminal. A menu function of the portable terminal in the music play mode is selected. The portable terminal switches to a mode of the selected menu of the portable terminal and implements a corresponding function while continuing to play the music upon selection of the menu function of the portable terminal. The portable terminal switches to the music play mode upon termination of the mode of the selected menu of the portable terminal.

BRIEF DESCRIPTION OF THE DRAWINGS

The above and other exemplary objects, features, and advantages of exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
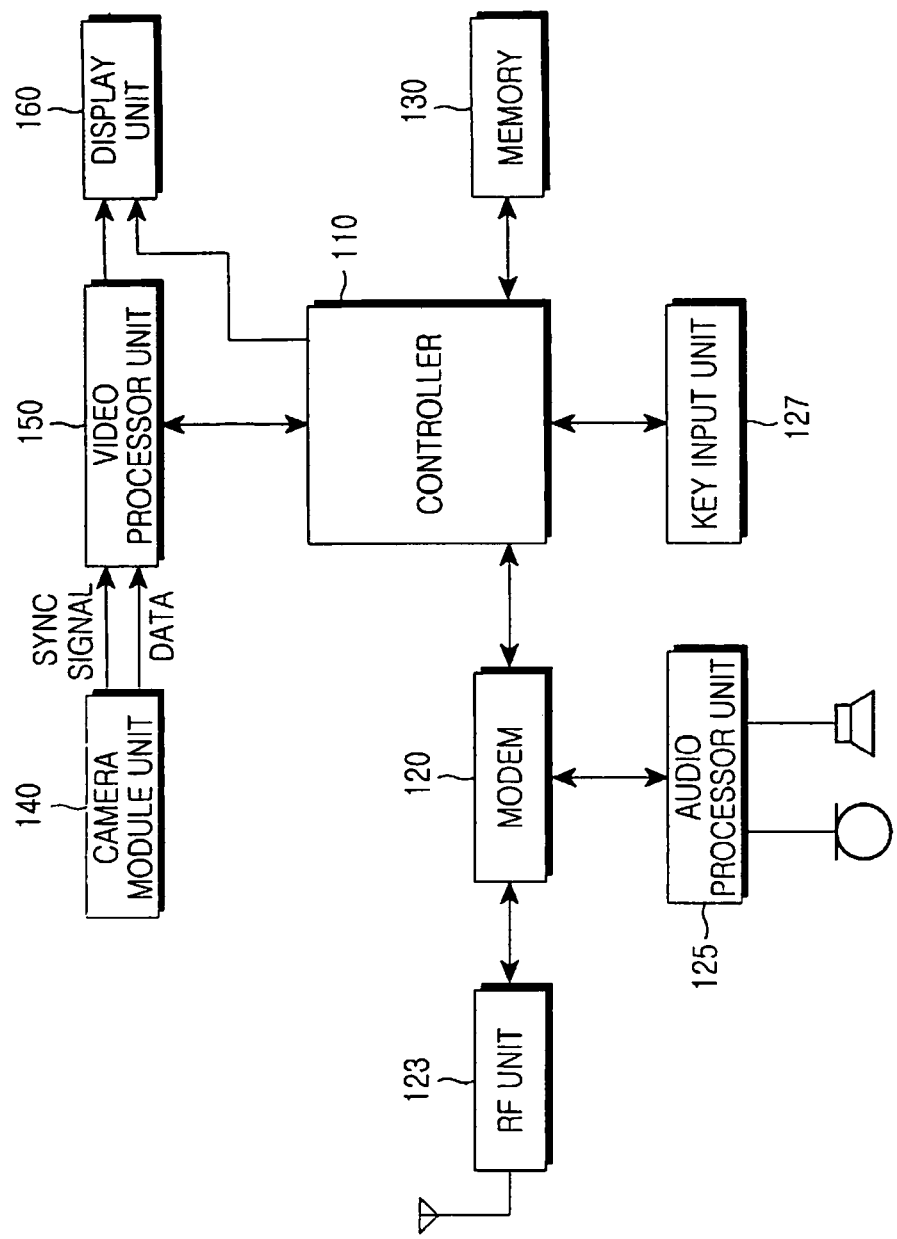
FIG. 1 is a block diagram of a portable terminal according to an exemplary embodiment of the present invention.

FIG. 1 is a block diagram of a portable terminal according to an exemplary embodiment of the present invention, in which an MP3 music processor is not included. Application modules of the portable terminal include at least one applet and each of the application modules, that is each menu of the portable terminal, independently performs multi-tasking.

Referring to FIG. 1, a Radio Frequency (RF) unit 123 performs radio communication for the portable terminal. The RF unit 123 includes an RF transmitter (not shown) for up-converting a frequency of a transmission signal and amplifying the up-converted transmission signal and an RF receiver (not shown) for low-noise-amplifying a received signal and down-converting a frequency of the low-noise-amplified signal.

A modem 120 includes a transmitter for encoding and modulating the transmission signal and a receiver for decoding and demodulating the received signal.

An audio processor unit 125 may be a codec including a data codec for processing packet data and an audio codec for processing an audio signal. The audio processor unit 125 converts a digital audio signal received from the modem 120 into an analog signal through the audio codec for reproduction. Alternatively, the audio processor unit 125 converts a transmission analog audio signal generated by a microphone into a digital audio signal through the audio codec for transmission to the modem 120. The codec is included in the controller 110 or it is provided separately. According to an exemplary embodiment of the present invention, the audio processor unit 125 performs an MP3 music play function in a standby mode of the portable terminal. In addition, the audio processor unit 125 performs the MP3 music play function while implementing menu functions of the portable terminal according to an exemplary embodiment of the present invention.

A memory 130 is comprised of program memories and data memories. The program memories store programs for controlling general operations of the portable terminal and control programs for implementing various menu functions of the portable terminal while continuing to play an MP3 music file according to an exemplary embodiment of the present invention. The data memories temporarily store data generated during execution of the programs.

A controller 110 controls the overall operation of the portable terminal. The controller 110 includes the modem 120 and the codec. The controller 110 performs controlling to switch the portable terminal to the standby mode while continuing to play an MP3 music file according to an exemplary embodiment of the present invention. The controller 110 also implements menu functions of the portable terminal while continuing to play an MP3 music file according to an exemplary embodiment of the present invention.

A camera module unit 140 includes a camera sensor and a signal processor. The camera sensor photographs image data and converts a photographed optical signal into an electric signal. A signal processor converts an analog image signal photographed by the camera sensor into digital data. The camera sensor is assumed to be a charge-coupled device (CCD) sensor and the signal processor may be implemented with a digital signal processor (DSP). The camera sensor and the signal processor may be integrated as one body or provided separately.

A video processor unit 150 generates screen data for displaying an image signal output from the camera module unit 140. The video processor unit 150 processes an image signal output from the camera module unit 140 by the frame unit and outputs frame image data suitable for the characteristic and the size of a display unit 160. The video processor unit 150 includes a video codec and compresses frame image data displayed on the display unit 160 according to a predetermined compression method or reconstructs compressed frame image data into original frame image data. The video codec may be JPEG codec, MPEG-4 codec, or Wavelet codec. The video processor unit 150 is assumed to have an On Screen Display (OSD) function and may output OSD data according to a screen size displayed under the control of the controller 110.

The display unit 160 displays an image signal output from the video processor unit 150 on a screen and displays user data output from the controller 110. Preferably, the display unit 160 may be a liquid crystal display (LCD), and if so, the display unit 160 may include an LCD controller, a memory for storing image data, and an LCD device. When the LCD is implemented with a touch screen, the display unit 160 may also serve as an input unit. The display unit 160 displays MP3 music information in an MP3 music play mode according to an exemplary embodiment of the present invention. According to an exemplary embodiment of the present invention, the display unit 160 also displays information that an MP3 music file is being played in the standby mode of the portable terminal. The display unit 160 also displays information that the MP3 music file is being played during implementation of menu functions of the portable terminal.

A key input unit 127 includes alphanumeric keys for inputting number and character information and function keys for setting various functions. The key input unit 127 may also include a key for controlling MP3 music according to an exemplary embodiment of the present invention.

Hereinafter, a multi-tasking operation in the portable terminal will be described in detail with reference to FIGS. 2 and 3.

Figure 2:
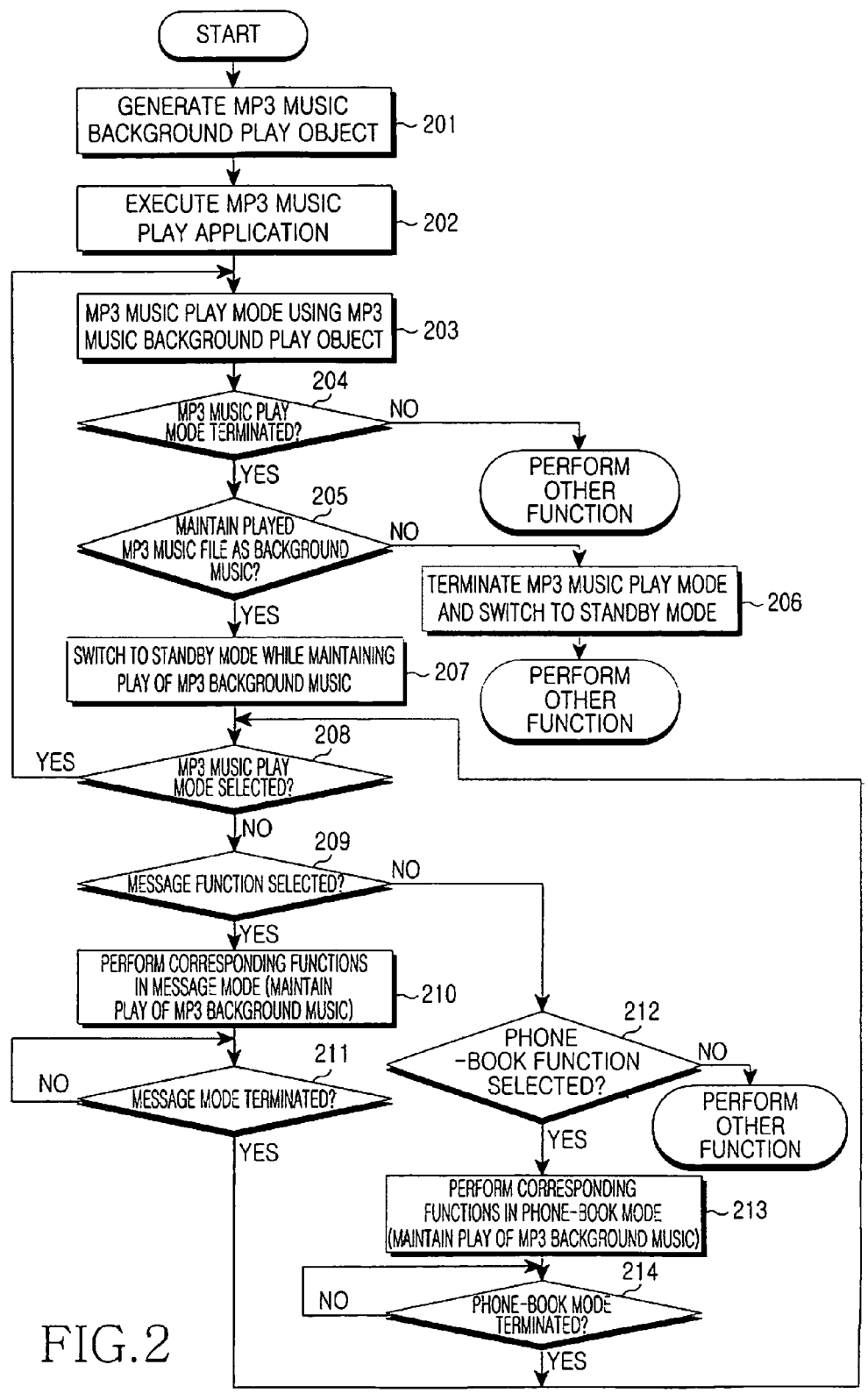
FIG. 2 is a flowchart illustrating a process of implementing menu functions of a portable terminal while continuing to play a music file according to a first exemplary embodiment of the present invention.

FIG. 2 is a flowchart illustrating a process of implementing menu functions of the portable terminal while continuing to play a music file according to a first exemplary embodiment of the present invention. In the first exemplary embodiment of the present invention, various menu functions such as message, phone-book, scheduling, game, and picture searching functions among others are simultaneously implemented.

The exemplary embodiments of the present invention will be described in detail with reference FIG. 1.

Referring to FIG. 2, the controller 110 of the portable terminal generates an MP3 music background play object in the standby mode in step 201 to play an MP3 music file as background music. The MP3 music background play object generated in step 201 internally acquires a task for MP3 music background play, returns to the standby mode, and provides a control interface to allow other applications to transmit commands for music play and control through the MP3 music background play object.

When an MP3 music play command is selected in the portable terminal, the controller 110 senses the selection and executes an MP3 music play application in step 202. The controller 110 transmits the MP3 music play command to the activated MP3 music background play object in the standby mode through an interface for an execution command provided by the MP3 music background play object. The MP3 music background play object switches to an MP3 music play mode by multi-tasking in step 203.

If termination of the MP3 music play mode is selected in the MP3 music play mode in step 204, the controller 110 senses the selection and displays a message asking whether to maintain the played MP3 music file as background music in step 205.

If the played MP3 music file is not selected as background music, the controller 110 terminates the MP3 music play mode and switches the portable terminal to the standby mode in step 206.

Alternatively, when the played MP3 music file is selected as background music, the controller 110 senses the selection and switches the portable terminal to the standby mode while maintaining the played MP3 music file, as background music in step 207. If the played MP3 music file is to be maintained as background music, in step 205, the controller 110 switches the portable terminal to the standby mode while maintaining the play of the MP3 music file as background music in step 207. Since the MP3 music file is played through multi-tasking of the MP3 music background play object activated in the standby mode in step 207, the play of the MP3 music file can continue regardless of termination of the MP3 music play mode. In the standby mode of step 207, image data indicating information relating to the MP3 music file that is being played as background music, for example a title and a singer, may be overlaid on a background image of the portable terminal. The type of the MP3 music information displayed on a standby screen may be selectively displayed. An icon or a message indicating that the MP3 music file is being played may be displayed in the standby mode of step 207.

If the MP3 music play mode is selected in the standby mode maintaining the play of MP3 background music in step 208, the controller 110 senses the selection and switches the portable terminal to the MP3 music play mode of step 203.

If the message function is selected in the standby mode maintaining the play of MP3 background music in step 209, the controller 110 senses the selection and switches the portable terminal to a message mode in step 210. In the message mode of step 210, the controller 110 performs controlling to implement functions such as message transmission and message checking while continuing to play MP3 background music. In the message mode of step 210, an icon or a message indicating that the MP3 music file is being played is displayed.

If termination of the message mode maintaining the play of MP3 background music is selected in step 211, the controller 110 senses the selection and switches the portable terminal to the standby mode of step 207 maintaining the play of MP3 background music.

If the phone-book function is selected in the standby mode maintaining the play of MP3 background music in step 212, the controller 110 senses the selection and switches the portable terminal to a phone-book mode in step 213. In the phone-book mode of step 213, the controller 110 performs controlling to implement functions such as telephone number searching and registration while continuing to play MP3 background music. In the phone-book mode of step 213, an icon or a message indicating that the MP3 music file is being played is displayed.

If termination of the phone-book mode maintaining the play of MP3 background music is selected in step 214, the controller 110 senses the selection and switches the portable terminal to the standby mode of step 207 maintaining the play of MP3 background music.

As such, MP3 music files selected in the MP3 music play mode of step 203 are repetitively played in the standby mode, the message mode, and the phone-book mode.

Figure 3:
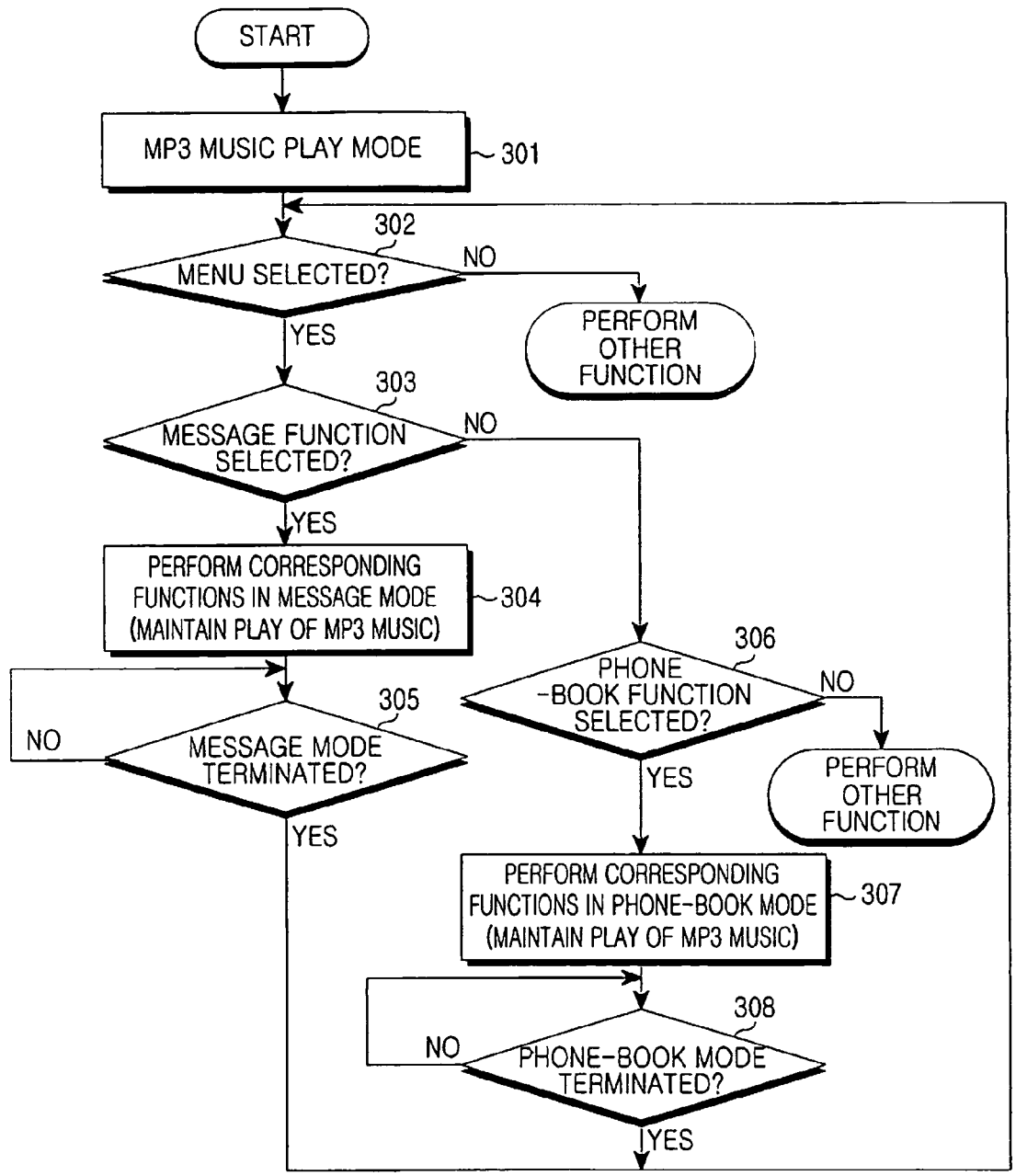
FIG. 3 is a flowchart illustrating a process of implementing menu functions of a portable terminal while continuing to play a music file according to a second exemplary embodiment of the present invention.

FIG. 3 is a flowchart illustrating a process of implementing menu functions of the portable terminal while continuing to play a music file according to a second exemplary embodiment of the present invention. In the second exemplary embodiment of the present invention, a message function and a phone-book function such as message, phone-book, scheduling, game, and picture searching functions among others are simultaneously implemented.

The exemplary embodiments of the present invention will be described in detail with reference FIG. 3.

Referring to FIG. 3, if a menu is selected in step 302 where MP3 music files selected in an MP3 music play mode of the portable terminal of step 301 are being played, the controller 110 senses the selection and displays menus of the portable terminal that can be implemented in the MP3 music play mode.

If the message function is selected among the menu functions of the portable terminal in step 303, the controller 110 senses the selection and switches the portable terminal to the message mode. In the message mode of step 304, the controller 110 implements functions such as message transmission and message checking while continuing to play the MP3 music file that is being played in the MP3 music play mode in step 304. In the message mode of step 304, an icon or a message indicating that the MP3 music file is being played may be displayed.

If termination of the message mode maintaining the play of the MP3 music file is selected in step 305, the controller 110 senses the selection and switches the portable terminal to the MP3 music play mode of step 301.

If the phone-book function is selected in step 306, the controller 110 senses the selection and switches the portable terminal to the phone-book mode. In the phone-book mode of step 307, the controller 110 implements functions such as telephone number searching and registration while continuing to play MP3 background music. In the phone-book mode of step 307, an icon or a message indicating that the MP3 music file is being played may be displayed.

If termination of the phone-book mode maintaining the play of MP3 music is selected, the controller 110 senses the selection and switches the portable terminal to the MP3 music play mode of step 301.

As such, MP3 music files selected in the MP3 music play mode of step 301 are repetitively played in the standby mode, the message mode, and the phone-book mode.

As described above, according to the exemplary embodiments of the present invention, menu functions can be implemented while continuing to play music in a portable terminal. Therefore, various applications of the portable terminal can be simultaneously implemented during the play of music, thereby maximizing user convenience.

Moreover, a separate music control processor is not included in a portable terminal, thereby preventing cost increase in the portable terminal and complexity in hardware and software configurations. Furthermore, exemplary embodiments of the present invention can also be used for portable terminal applications to be developed without a requirement for separate processing.

While the present invention has been shown and described with reference to exemplary embodiments thereof, it will be understood by those skilled in the art that various changes in form and details may be made therein without departing from the spirit and scope of the invention as defined by the appended claims.

What is claimed is:

1. A multi-tasking apparatus in a portable terminal, the multi-tasking apparatus comprising:
   a controller for controlling implementation of at least one menu function while playing a music file; and
   a display unit for displaying an indication that the music file is being played during the implementation of the menu function;
   wherein the controller switches the portable terminal to a standby mode while playing the music file as background music upon selection of the music file as the background music during the play of the music file and controls the implementation of the at least one menu function while playing the background music upon selection of the menu function in the standby mode where the background music is being played.

2. The multi-tasking apparatus of claim 1, wherein the controller controls the implementation of a corresponding function by switching the portable terminal to a menu mode while playing the music file upon selection of the menu mode in a music play mode where the music file is being played, and switches the portable terminal to the music play mode upon termination of the selected menu mode.

3. The multi-tasking apparatus of claim 1, wherein the display unit displays an indication that a music file selected as background music is being played in a standby mode.

4. The multi-tasking apparatus of claim 1, wherein the display unit displays image data comprising information indicative of a selected music file as background music and being played in a standby mode.

5. The multi-tasking apparatus of claim 4, wherein the display unit overlays the image data comprising the information indicative of the selective music file on a background image of the standby mode.

6. A multi-tasking method in a portable terminal, the multi-tasking method comprising:
   selectively playing a music file in a portable terminal; and
   selectively implementing at least one menu function of the portable terminal while playing the music file;
   wherein the implementing of the menu functions of the portable terminal comprises the steps of:
      selecting the music file as background music during the play of the music file;
      switching to the standby mode while playing the music file as the background music upon the selecting of the music file as the background music; and
      implementing at least one of the menu functions of the portable terminal in the standby mode while maintaining the playing of background music.

7. The multi-tasking method of claim 6, wherein the playing of the music file comprises the steps of:
   generating a music background play object in a standby mode;
   acquiring a task for music background play by the music background play object and providing a control interface for music play; and
   playing the music file through multi-tasking in the standby mode using the music background play object upon selection of a music play mode.

8. The multi-tasking method of claim 6, further comprising displaying an indication that the music file is being played in the standby mode.

9. The multi-tasking method of claim 6, further comprising displaying information relating to the music file played as the background music in the standby mode.

10. The multi-tasking method of claim 9, wherein the displaying of the information comprises overlaying image data indicating the information on a background image of the portable terminal.

11. The multi-tasking method of claim 6, further comprising maintaining the play of background music during implementation of the menu functions of the portable terminal.

12. The multi-tasking method of claim 11, further comprising displaying information indicating that the music file is being played during implementation of the menu functions of the portable terminal.

13. A multi-tasking method in a portable terminal, the multi-tasking method comprising the steps of:
   generating a music background play object in a standby mode;
   acquiring a task for music background play by the music background play object and providing a control interface for music play;
   playing the music file through multi-tasking in the standby mode using the music background play object upon selection of a music play mode in the portable terminal;
   selecting the played music file as background music during the playing of the music file;
   switching to the standby mode while continuing to play the music as the background music upon the selecting of the played music file as the background music;
   implementing menu functions of the portable terminal in the standby mode maintaining the playing of the background music; and
   implementing the menu functions of the portable terminal while playing the background music.

14. The multi-tasking method of claim 13, further comprising displaying an indication that the music file is being played in the standby mode.

15. The multi-tasking method of claim 13, further comprising displaying information relating to the music file played as the background music in the standby mode.

16. The multi-tasking method of claim 15, wherein the displaying of the information comprises overlaying image data indicating the information on a background image of the portable terminal.

17. The multi-tasking method of claim 13, further comprising maintaining the play of background music during implementation of the menu functions of the portable terminal.

* * * * *